(12) United States Patent
Cho et al.

(10) Patent No.: US 7,079,461 B2
(45) Date of Patent: Jul. 18, 2006

(54) ECCENTRICITY COMPENSATION APPARATUS BASED ON FREQUENCY RESPONSE CHARACTERISTICS OF AN ACTUATOR OF A DISK DRIVE SERVO SYSTEM

(75) Inventors: Seong-il Cho, Seoul (KR); Joong-eon Seo, Gyeonggi-do (KR); Soo-yul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 10/028,979

(22) Filed: Dec. 28, 2001

(65) Prior Publication Data

US 2002/0118618 A1 Aug. 29, 2002

(30) Foreign Application Priority Data

Dec. 29, 2000 (KR) ............................... 2000-86283

(51) Int. Cl.
*G11B 7/095* (2006.01)
(52) U.S. Cl. ............................... 369/53.14; 369/44.32; 369/44.36
(58) Field of Classification Search ............. 360/77.02, 360/77.04; 367/53.14, 44.32, 53.13, 53.3, 367/44.35, 44.36, 53.28
See application file for complete search history.

(56) References Cited

U.S. PATENT DOCUMENTS

| | | | | |
|---|---|---|---|---|
| 5,479,386 A | * | 12/1995 | Takeshita et al. | 369/44.14 |
| 5,550,685 A | | 8/1996 | Drouin | |
| 6,147,467 A | | 11/2000 | Yu et al. | |
| 6,166,875 A | * | 12/2000 | Ueno et al. | 360/77.04 |
| 6,411,461 B1 | * | 6/2002 | Szita | 360/77.07 |
| 6,498,772 B1 | * | 12/2002 | Fujiune et al. | 369/44.29 |
| 6,606,213 B1 | * | 8/2003 | Ooi et al. | 360/75 |
| 6,751,046 B1 | * | 6/2004 | Szita et al. | 360/77.04 |
| 2002/0141303 A1 | * | 10/2002 | Kim | 369/44.32 |

FOREIGN PATENT DOCUMENTS

| | | |
|---|---|---|
| EP | 0 306 151 | 3/1989 |
| JP | 61-177690 | 8/1986 |
| JP | 01-140432 | 6/1989 |
| JP | 02-226525 | 9/1990 |

(Continued)

*Primary Examiner*—William Klimowicz
*Assistant Examiner*—Michael V. Battaglia
(74) *Attorney, Agent, or Firm*—Stein, McEwen & Bui, LLP

(57) ABSTRACT

An eccentricity compensating apparatus of a disk drive servo system using frequency response characteristics of an actuator actuating a head to a position on a disk to read data on or reproduce data from the disk. The apparatus includes an error detector that detects a position error between a reference head position and an actual position of the head on the disk and a first compensation controller that receives the position error from the error detector and changes the actual position of the head to compensate for the position error. The apparatus also includes a second compensation controller that generates and outputs a control value to compensate for eccentricity which varies depending on a phase of a spindle that rotates the disk, and a gain/phase adjuster that adjusts gain and phase of the control value output from the second compensation controller according to a disk reproduction speed, wherein a drive signal of the actuator is obtained by summing together signals output from the first compensation controller and the gain/phase adjuster. Thus, the eccentricity compensation apparatus compensates for eccentricity at varying reproduction speeds by adjusting control data estimated for eccentricity compensation at specific reproduction speed based on frequency response characteristics of an actuator.

13 Claims, 3 Drawing Sheets

FOREIGN PATENT DOCUMENTS

| | | |
|---|---|---|
| JP | 03-142721 | 6/1991 |
| JP | 03-194736 | 8/1991 |
| JP | 06-176378 | 6/1994 |
| JP | 06-176514 | 6/1994 |
| JP | 6-203390 | 7/1994 |
| JP | 7-122011 | 5/1995 |
| JP | 11-126444 | 5/1999 |
| JP | 2000-339729 | 12/2000 |

* cited by examiner

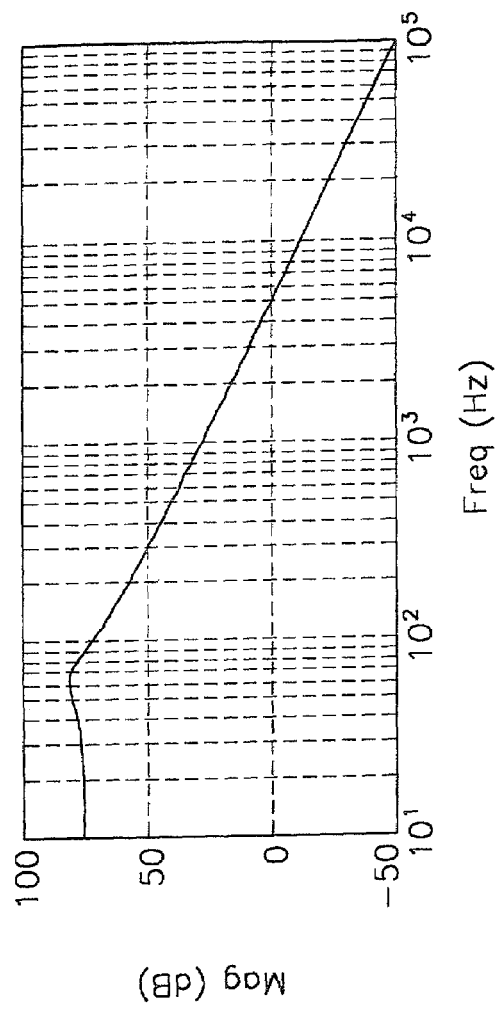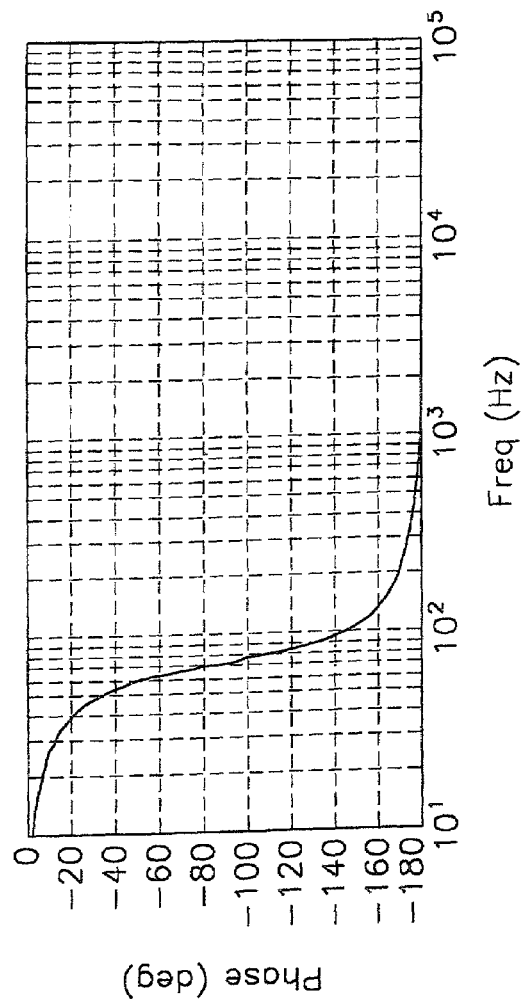
FIG. 3A
FIG. 3B

ECCENTRICITY COMPENSATION APPARATUS BASED ON FREQUENCY RESPONSE CHARACTERISTICS OF AN ACTUATOR OF A DISK DRIVE SERVO SYSTEM

CROSS REFERENCE TO RELATED APPLICATIONS

This application claims the benefit of Korean Application No. 2000-86283, filed Dec. 29, 2000, in the Korean Industrial Property Office, the disclosure of which is incorporated hereby reference.

BACKGROUND OF THE INVENTION

1. Field of the Invention

The present invention relates to eccentricity compensation in a disk drive servo system, and more particularly, to an eccentricity compensation apparatus of a disk drive servo system which is effectively adapted to a variation in reproduction speed of a disk by adjusting a gain and phase of control data estimated at a specific reproduction speed and stored in a feedforward look-up table, based on frequency response characteristics of an actuator.

2. Description of the Related Art

Eccentricity occurs when the center of a disk track deviates from an axis of a spindle about which a disk rotates. The eccentricity acts as periodic disturbance on a disk drive system, thereby significantly degrading track following performance thereof. In particular, as speed at which a disk is reproduced (e.g., disk reproduction speed) increases, eccentricity increasingly degrades the control performance of a disk drive system. Thus, for example, to accurately trace a track at high reproduction speed, eccentricity needs to be effectively compensated for. A number of techniques have been developed to compensate for eccentricity.

FIG. 1 shows an example of a conventional disk drive servo system compensating for eccentricity.

Referring now to FIG. 1, the conventional disk drive servo system includes an optical system 100, a feedback controller 110, a feedforward look-up table 120, and an actuator 130. The optical system 100 detects an error e(t) between the actual position of a head on a disk and a reference head position d(t), which corresponds to a displacement of the actuator 130, and outputs the error e(t) detected. The feedback controller 110 performs compensation control according to the error e(t) to output an actuator drive control value $U_{fb}(t)$. The feedforward look-up table 120 outputs an actuator drive control value $U_{ff}(t)$ which is estimated and stored according to a phase of a spindle to compensate for eccentricity. The actuator 130 is moved to a position on the disk by a control value U(t) which is obtained by the actuator drive control values $U_{fb}(t)$ and $U_{ff}(t)$, output from the feedback controller 110 and the feedforward look-up table 120, respectively.

The conventional disk drive servo system compensates for eccentricity by storing a compensation value for eccentricity compensation in the feedforward look-up table 120, and outputting a result of a summation of the compensation value and the control value output from the feedback controller 110, as the actuator drive control value. Typically, for example, eccentricity varies depending on a phase of a spindle.

Eccentricity present in the disk drive servo system has constant magnitude and varying frequency as the disk reproduction speed changes. The impact of eccentricity upon the system due to changes in the disk reproduction speed varies depending on the frequency response characteristics of the actuator 130. Thus, for example, to effectively compensate for eccentricity, data of the feedforward look-up table 120 needs to be updated each time the disk reproduction speed changes. Since eccentricity becomes significantly larger at high reproduction speeds, the feedback controller 110 does not appropriately perform a tracking control. In this case, data of the feedforward look-up table 120 is not updated, thereby making eccentricity compensation of the actuator 130 impossible.

SUMMARY OF THE INVENTION

Accordingly, it is an object of the present invention to provide an eccentricity compensation apparatus of a disk drive servo system which is effectively adapted to a variation in reproduction speed of a disk by adjusting a gain and phase of control data estimated at a specific reproduction speed and stored in a feedforward look-up table, based on frequency response characteristics of an actuator.

Additional objects and advantages of the invention will be set forth in part in the description which follows and, in part, will be obvious from the description, or may be learned by practice of the invention.

The foregoing and other objects of the present invention are achieved by providing an eccentricity compensation apparatus of a disk drive servo system using frequency response characteristics of an actuator actuating a head to a position on a disk to read data on or reproduce data from the disk. The apparatus includes an error detector that detects a position error between a reference head position and an actual position of the head on the disk. The apparatus includes a first compensation controller that receives the position error from the error detector and changes the actual position of the head to compensate for the position error and a second compensation controller that generates and outputs a control value to compensate for eccentricity which varies depending on a phase of a spindle that rotates the disk. The apparatus also includes a gain/phase adjuster that adjusts a gain and phase of the control value output from the second compensation controller according to a disk reproduction speed, wherein a drive signal of the actuator is obtained by summing together signals output from the first compensation controller and the gain/phase adjuster.

The second compensation controller is a feedforward look-up table that stores control data estimated at a predetermined reproduction speed and used for eccentricity compensation through gain and phase adjustment.

The gain/phase adjuster adjusts the gain and the phase of the control value output from the second compensation controller according to the disk reproduction speed based on frequency response characteristics of the actuator.

BRIEF DESCRIPTION OF THE DRAWINGS

These and other objects and advantages of the invention will become apparent and more appreciated from the following description of the preferred embodiments, taken in conjunction with the accompanying drawings of which:

FIGS. 3A and 3B are graphs showing examples of frequency response characteristics of an actuator, according to an embodiment of the present invention.

DETAILED DESCRIPTION OF THE PREFERRED EMBODIMENTS

Figure 1:
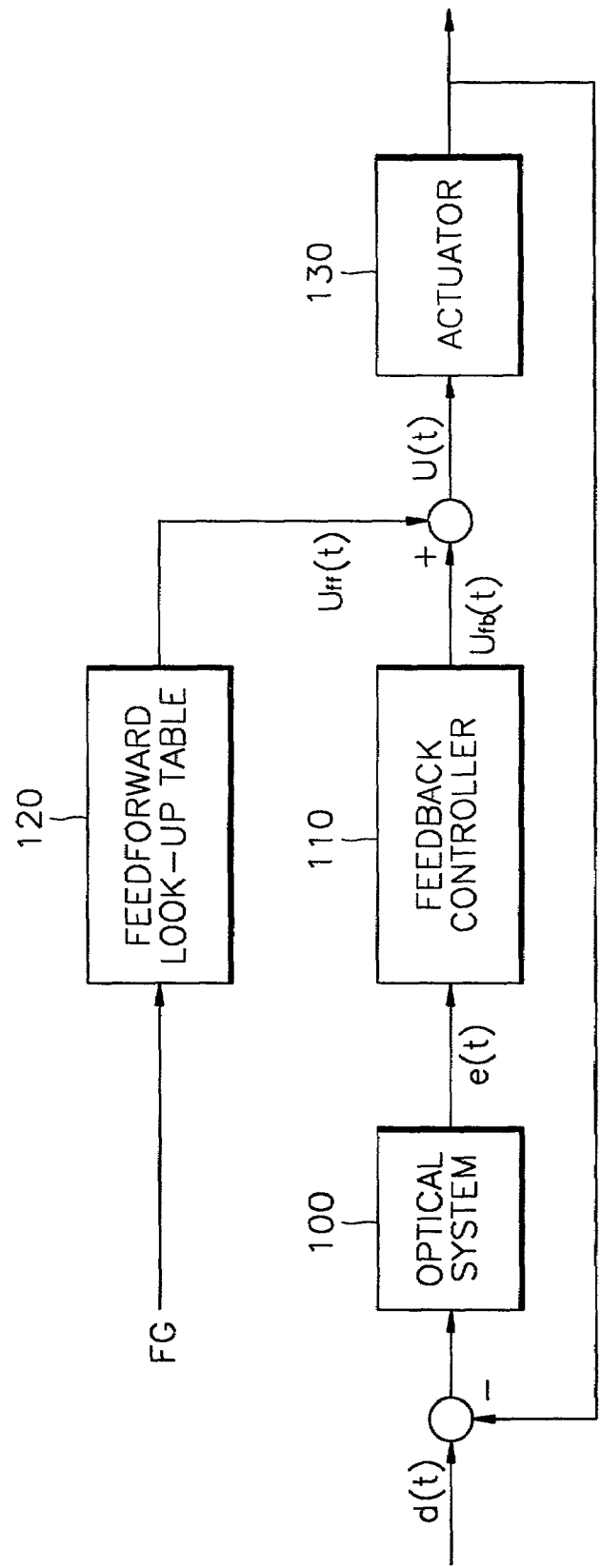
FIG. 1 is an example of a conventional disk drive servo system compensating for eccentricity.

Reference will now be made in detail to the present preferred embodiments of the present invention, examples of which are illustrated in the accompanying drawings, wherein like reference numerals to like elements throughout.

Figure 2:
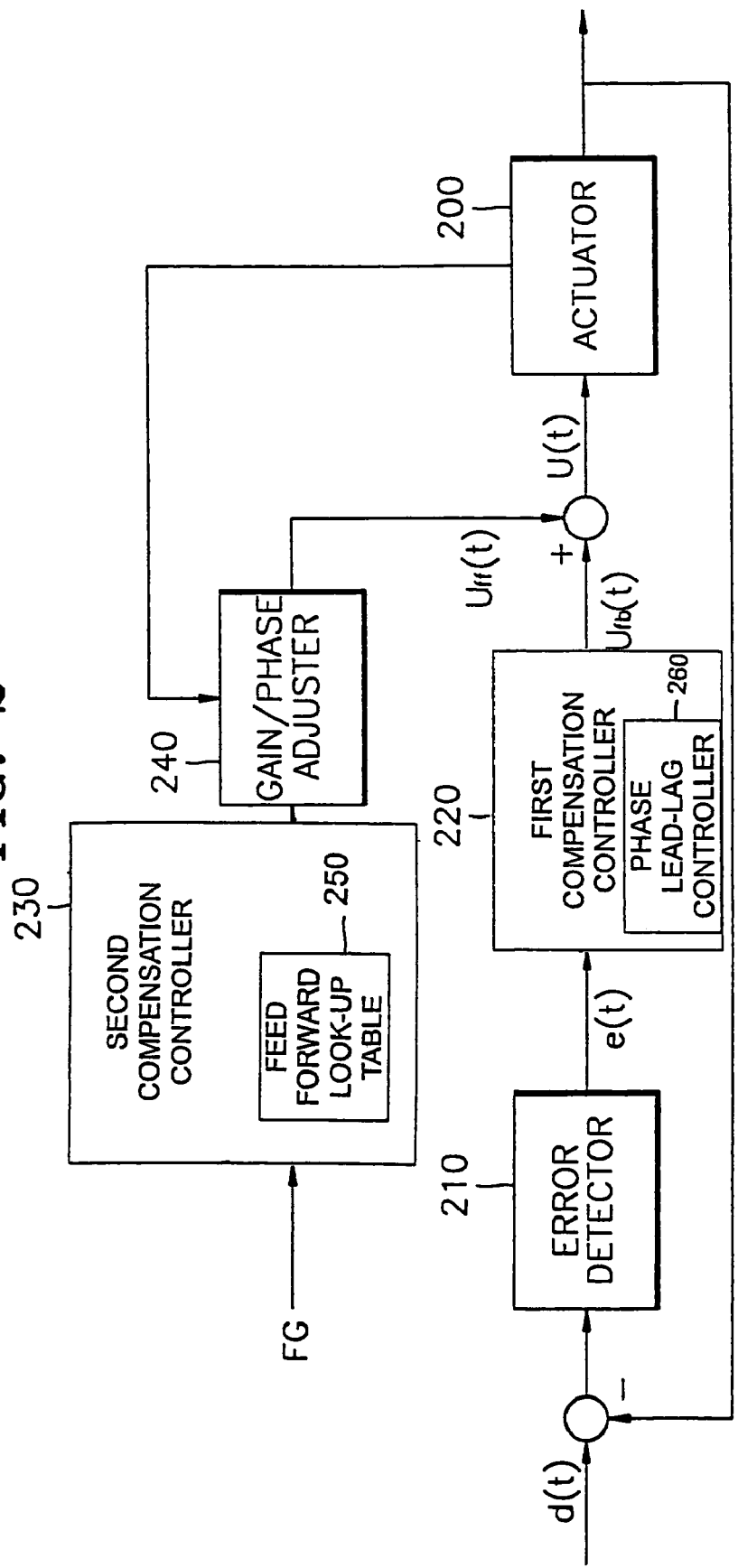
FIG. 2 is of an eccentricity compensation apparatus using frequency response characteristics of an actuator of a disk drive servo system, according to an embodiment of the present invention.

FIG. 2 is an eccentricity compensation apparatus using frequency response characteristics of an actuator in a disk drive servo system, according to an embodiment of the present invention.

Referring now to FIG. 2, the eccentricity compensation apparatus includes an actuator 200, an error detector 210, a first compensation controller 220, a second compensation controller 230, and a gain/phase adjuster 240.

The actuator 200 determines the position of a head (e.g., a pickup head and the like) recording data onto a disk or reproducing recorded data. Since the impact of eccentricity upon the system varies depending on disk reproduction speed, an appropriate compensation control for an error due to the eccentricity is needed to drive the actuator 200 to accurately follow a track. The error detector 210 detects an error e(t) (e.g., position error) between a reference head position d(t) and an actual position of the head on the disk. The first compensation controller 220 receives the position error e(t) from the error detector 210 and generates and outputs an actuator control value $U_{fb}(t)$ to compensate for the position error e(t) by changing the actual position of the head. The actuator control value $U_{fb}(t)$ output from the first compensation controller 220 is obtained, for example, by various possible control algorithms, generally by a phase lead-lag controller 260.

The first compensation controller 220 serves as a feedback controller that receives a reference signal and receives an actual signal of the actuator 200, which corresponds to the actual position of the head, and performs a compensation control using the received signal. The second compensation controller 230 receives and stores control values for one period to compensate for an error of the actuator 200 caused by periodic disturbances such as eccentricity of the disk at a specific reproduction speed. Here, the control values refer to estimated values of gain and phase characteristics of the actuator 200 at the specific reproduction speed to be used for eccentricity compensation at varying reproduction speeds. The second compensation controller 230 serves as a feedforward look-up table 250 pre-storing estimated compensation values determined from simulations, tests, or experience by estimating the gain and phase characteristics of the actuator 200 upon eccentricity at specific reproduction speeds. The gain/phase adjuster 240 adjusts the gain and phase of an output signal from the second compensation controller 230 according to varying reproduction speeds based on the frequency response characteristics of the actuator 200 and outputs an adjusted value $U_{ff}(t)$.

The actuator 200 maintains a constant gain and phase to actuate the actuator 200 even if the reproduction speed changes, so long as the reproduction speed is less than a predetermined value. However, when the reproduction speed is a predetermined value or greater, the gain decreases and phase lag increases. That is, for example, control characteristics of the actuator 200 significantly change when the reproduction speed is greater than the predetermined value. The gain/phase adjuster 240 calculates the adjusted value $U_{ff}(t)$ by changing the gain and phase of the output value of the second compensation controller 230 based on the frequency response characteristics of the actuator 200, which are dependent on variations in the reproduction speed. The actuator 200 is driven according to a drive signal obtained by summation of the actuator control value $U_{fb}(t)$ output from the first compensation controller 220 and the adjusted value $U_{ff}(t)$ output from the gain/phase adjuster 240.

FIGS. 3A and 3B are graphs showing examples of frequency response characteristics of an actuator 200.

Referring now to FIGS. 3A and 3B, the graphs show changes in gain and phase with respect to frequency. When the disk reproduction speed changes, identifying the frequency response characteristics of the actuator 200 enables the second compensation controller 230 to calculate the adjusted value $U_{ff}(t)$ from the estimated compensation values stored therein, even if the estimated compensation values have been estimated at a low speed reproduction for eccentricity compensation at varying reproduction speeds.

The operation of the eccentricity compensation apparatus according to FIG. 2 of the present invention is described below.

Compensating for eccentricity using a feedforward look-up table obtained based on a phase of a spindle is implemented in various ways. One approach is disclosed in Korean Patent Application No. 2000-49866 (filed Aug. 26, 2000) which describes eccentricity compensation using learning control techniques. At a specific reproduction speed at which a feedback controller corresponding to the first compensation controller 220 of FIG. 2 operates smoothly, control data in the feedforward look-up table for eccentricity compensation is estimated in various ways using a tracking error signal. If control data of the feedforward look-up table for eccentricity compensation is accurately estimated, a magnitude of a tracking error is zero, and the feedforward look-up table is obtained using the following equation:

$$U_{ff}(s) = \frac{D(s)}{G(s)}$$

Here, $U_{ff}(s)$ and D(s), which are the Laplace transforms for $U_{ff}(t)$ and d(t), denote the control data of the feedforward look-up table and the eccentricity, respectively. G(s) denotes a transfer function of the actuator 200. The eccentricity D(s) has constant magnitude and phase, while only frequency varies as the disk reproduction speed changes. The transfer function G(s) of the actuator 200 expresses the frequency response characteristics of the actuator 200 in which the gain is decreased and the phase is lagged with increased frequency. If the data $U_{ff}(s)$ of the feedforward look-up table estimated at a specific disk reproduction speed using the equation above, is applied to reproduction at a high reproduction speed due to the gain and phase of the actuator upon eccentricity being the same at any reproduction speed, compensation for eccentricity at the high reproduction speed is incorrect. This, for example, is because actual gain reduction and phase lag caused by the frequency response characteristics of the actuator 200 at the high reproduction speed are not reflected. Thus, the control data of the feedforward look-up table estimated at a specific reproduction speed is not applied if there is a large change in the reproduction speed.

However, according to the present invention, the gain/phase adjuster 240 compensates for gain reduction and phase lag in frequency response characteristics G(s) of the actuator 200 based on control data in a feedforward look-up table estimated at a specific reproduction speed, without updating the control data in the feedforward look-up table each time reproduction speed changes. For example, the control data is used in the feedforward look-up table estimated at a low reproduction speed for a high-speed reproduction. Accordingly, the gain/phase adjuster 240 compensates for gain reduction and phase lag due to frequency changes at varying reproduction speeds (e.g., frequency response characteristics of the actuator 200).

Therefore, the eccentricity compensation apparatus according to the present invention compensates for eccentricity at varying reproduction speeds by adjusting control data estimated for eccentricity compensation at a specific reproduction speed based on the frequency response characteristics of the actuator 200.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An eccentricity compensation apparatus of a disk drive servo system having an actuator actuating a head to a position on a disk rotated by a spindle to read data on or reproduce data from the disk, the apparatus comprising:
   an error detector that detects a position error between a reference head position and an actual position of the head on the disk;
   a first compensation controller that receives the position error from the error detector and generates and outputs a first control value to compensate for the position error by changing the actual position of the head;
   a second compensation controller that generates and outputs a second control value to compensate for eccentricity which varies depending on a phase of the spindle that rotates the disk; and
   a gain/phase adjuster that adjusts gain and phase of the second control value output from the second compensation controller according to a reproduction speed of the disk,
   wherein a drive signal of the actuator is obtained by summing the signals output from the first compensation controller and the gain/phase adjuster,
   wherein the second compensation controller comprises a feedforward look-up table that stores control data estimated at a predetermined reproduction speed and used for compensating the eccentricity via the gain and phase adjustment, and
   wherein the gain/phase adjuster compensates for gain reduction and phase lag in frequency response characteristics of the actuator based on the control data in the feedforward look-up table estimated at a predetermined reproduction speed, without updating the control data in the feedforward look-up table each time the reproduction speed changes.

2. The apparatus of claim 1, wherein the gain/phase adjuster adjusts the gain and phase of the second control value output from the second compensation controller according to the disk reproduction speed based on frequency response characteristics of the actuator.

3. The apparatus of claim 1, wherein the first compensation controller comprises a phase lead-lag controller to obtain the first control value.

4. The apparatus of claim 1, wherein the first compensation controller is a feedback controller that receives a reference signal and an actual signal of the actuator which corresponds to the actual position of the head, to perform a compensation control using the received signals.

5. The apparatus of claim 1, wherein the position error between the reference head position and the actual position of the head on the disk corresponds to a displacement of the actuator.

6. The apparatus of claim 1, wherein the control data in the feedforward look-up table used for the compensating of the eccentricity is obtained by using:

$$U_{ff}(s) = \frac{D(s)}{G(s)},$$

wherein,
   $U_{ff}(s)$ and $D(s)$ denote the control data and the eccentricity, respectively, and $G(s)$ denotes a transfer function indicating the frequency response characteristics of the actuator.

7. A method of eccentricity compensation of a disk drive servo system having an actuator actuating a head to a position on a disk rotated by a spindle to read data on or reproduce data from the disk, the method comprising:
   detecting a position error between a reference head position and an actual position of the head on the disk;
   receiving the position error, and generating and outputting a first control value to compensate for the position error by changing the actual position of the head;
   generating and outputting a second control value to compensate for eccentricity which varies depending on a phase of the spindle that rotates the disk;
   adjusting gain and phase of the second control value according to a reproduction speed of the disk, thereby obtaining a signal to drive the actuator from a summation of the first control value and the adjusted second control value; and
   compensating gain reduction and phase lag in frequency response characteristics of the actuator based on control data in a feedforward look-up table estimated at a predetermined reproduction speed, without updating the control data in the feedforward look-up table each time the reproduction speed changes.

8. The method of claim 7, further comprising:
   storing control data estimated at a predetermined reproduction speed and used for the compensating of the eccentricity via the gain and phase adjustment.

9. The method of claim 7, wherein the adjusting of the gain and phase of the second control value according to the disk reproduction speed is based on frequency response characteristics of the actuator.

10. An eccentricity compensation apparatus of a disk drive servo system having an actuator actuating a head to a position on a disk rotated by a spindle to read data on or reproduce data from the disk, the apparatus comprising:
    a controller generating and outputting first and second control values, the second control value being based on estimated control data at a predetermined reproduction speed of the disk and being used to compensate for eccentricity at varying reproduction speeds depending on a phase of the spindle; and
    a gain/phase adjuster adjusting a gain and a phase of the second control value based on the control data at a reproduction speed of the disk based on frequency response characteristics of the actuator, without updating the control data each time the reproduction speed changes, wherein a drive signal of the actuator is obtained by summing the first control value and the adjusted second control value.

11. A method of compensating for eccentricity of a disk drive servo system having an actuator actuating a head to a position on a disk rotated by a spindle to read data on or reproduce data from the disk, the method comprising:

generating and outputting first and second control values, the second control value being based on estimated control data at a predetermined reproduction speed of the disk and being used to compensate for eccentricity at varying reproduction speeds depending on a phase of the spindle; and adjusting gain and phase of the second control value based on the control data at a reproduction speed of the disk based on frequency response characteristics of the actuator, without updating the control data each time the reproduction speed changes, wherein a drive signal of the actuator is obtained by summing the first control value and the adjusted second control value.

12. An eccentricity compensation apparatus of a disk drive servo system having an actuator actuating a head to a position on a disk rotated by a spindle to read data on or reproduce data from the disk, the apparatus comprising:

an error detector that detects a position error between a reference head position and an actual position of the head on the disk;

a first compensation controller that receives the position error from the error detector and generates and outputs a first control value to compensate for the position error by changing the actual position of the head;

a second compensation controller that generates and outputs a second control value to compensate for eccentricity which varies depending on a phase of the spindle that rotates the disk; and a gain/phase adjuster that adjusts gain and phase of the second control value output from the second compensation controller according to a reproduction speed of the disk, wherein a drive signal of the actuator is obtained by summing the signals output from the first compensation controller and the gain/phase adjuster, wherein the second compensation controller comprises a feedforward look-up table that stores control data estimated at a predetermined reproduction speed and used for compensating the eccentricity via the gain and phase adjustment, and wherein the gain/phase adjuster compensates for gain reduction and phase lag in frequency response characteristics of the actuator based on the control data in the feedforward look-up table estimated at a predetermined reproduction speed.

13. A method of eccentricity compensation of a disk drive servo system having an actuator actuating a head to a position on a disk rotated by a spindle to read data on or reproduce data from the disk, the method comprising:

detecting a position error between a reference head position and an actual position of the head on the disk receiving the position error, and generating and outputting a first control value to compensate for the position error by changing the actual position of the head;

generating and outputting a second control value to compensate for eccentricity which varies depending on a phase of the spindle that rotates the disk;

adjusting gain and phase of the second control value according to a reproduction speed of the disk, thereby obtaining a signal to drive the actuator from a summation of the first control value and the adjusted second control value; and compensating gain reduction and phase lag in frequency response characteristics of the actuator based on control data in a feedforward look-up table estimated at a predetermined reproduction speed.

* * * * *